(12) United States Patent
Macchiano et al.

(10) Patent No.: US 9,135,451 B2
(45) Date of Patent: *Sep. 15, 2015

(54) DATA ISOLATION IN SHARED RESOURCE ENVIRONMENTS

(71) Applicant: INTERNATIONAL BUSINESS MACHINES CORPORATION, Armonk, NY (US)

(72) Inventors: Angelo Macchiano, Apalachin, NY (US); Bruce H. Ratcliff, Red Hook, NY (US); Forrest A. Schumacher, Endicott, NY (US); Jerry W. Stevens, Raleigh, NC (US); Richard P. Tarcza, Kingston, NY (US); Stephen R. Valley, Valatie, NY (US); Frederick C. Wong, Stormville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,450

(22) Filed: Nov. 12, 2013

(65) Prior Publication Data
US 2014/0090082 A1 Mar. 27, 2014

Related U.S. Application Data

(63) Continuation of application No. 12/246,718, filed on Oct. 7, 2008, now Pat. No. 8,621,485.

(51) Int. Cl.
*G06F 3/00* (2006.01)
*G06F 21/60* (2013.01)
*G06F 9/46* (2006.01)
*G06F 21/85* (2013.01)
*H04L 29/10* (2006.01)

(52) U.S. Cl.
CPC ................ *G06F 21/60* (2013.01); *G06F 9/468* (2013.01); *G06F 21/85* (2013.01); *H04L 29/10* (2013.01)

(58) Field of Classification Search
None
See application file for complete search history.

(56) References Cited

U.S. PATENT DOCUMENTS

| | | |
|---|---|---|
| 6,854,021 B1 | 2/2005 | Schmidt et al. |
| 2004/0010624 A1 | 1/2004 | Garofalo et al. |
| 2004/0128670 A1* | 7/2004 | Robinson et al. .................. 718/1 |
| 2004/0230757 A1 | 11/2004 | Brice, Jr. et al. |
| 2006/0045089 A1* | 3/2006 | Bacher et al. .................. 370/392 |
| 2006/0123204 A1 | 6/2006 | Brown et al. |
| 2008/0168461 A1 | 7/2008 | Arndt et al. |
| 2010/0088708 A1 | 4/2010 | Macchiano et al. |

OTHER PUBLICATIONS

Macchiano et al., Office Action for U.S. Appl. No. 12/246,718, filed Oct. 7, 2008 (U.S. Patent Publication No. 2010/0088708 A1), dated Oct. 17, 2011 (15 pages).

(Continued)

*Primary Examiner* — Sisley Kim
(74) *Attorney, Agent, or Firm* — Steven Chiu, Esq.; Kevin P. Radigan, Esq.; Heslin Rothenberg Farley & Mesiti P.C.

(57) ABSTRACT

A data connection of a shared resource is placed in isolation mode to remove its ability to communicate with other data connections of the shared resource. This ability to isolate the data connection is dynamic in that it can be turned on/off at any time. This provides increased data security for the entities using the data connection.

17 Claims, 8 Drawing Sheets

(56) References Cited

OTHER PUBLICATIONS

Macchiano et al., Final Office Action for U.S. Appl. No. 12/246,718, filed Oct. 7, 2008 (U.S. Patent Publication No. 2010/0088708 A1), dated Apr. 9, 2012 (19 pages).

Macchiano et al., Notice of Allowance for U.S. Appl. No. 12/246,718, filed Oct. 7, 2008 (U.S. Patent Publication No. 2010/0088708 A1), dated Aug. 26, 2013 (18 pages).

"z/Architecture—Principles of Operation", IBM Publication No. SA22-7832-06, Seventh Edition (Feb. 2008).

* cited by examiner

SET_ACCESS_CONTROL - REQUEST FORMAT

400

| OFFSET | LENGTH | DESCRIPTION |
|---|---|---|
| 0 | 2 | LENGTH OF THIS COMMAND INCLUDING THIS LENGTH FIELD |
| 2 | 2 | RESERVED |
| 4 | 4 | COMMAND CODE '00010000'X SET_ACCESS_CONTROL |
| 8 | 2 | RETURN CODE FOR THIS COMMAND |
| 10 | 1 | TOTAL NUMBER OF FRAMES USED IN THIS REQUEST (1 FOR THIS COMMAND) |
| 11 | 1 | SEQUENCE NUMBER OF THIS FRAME (1 FOR THIS COMMAND) |
| 12 | 4 | RESERVED |
| 16 | 4 | SUBCOMMAND CODE<br>'00000000'X - SET ACCESS CONTROL STATE TO NON-ISOLATED (DEFAULT)<br>'00000001'X - SET ACCESS CONTROL STATE TO ISOLATED FORWARD<br>'00000002'X - SET ACCESS CONTROL STATE TO ISOLATED DROP |
| 20 | 8 | RESERVED |

- 402 (length row)
- 404 (command code row)
- 406 (return code row)
- 408 (total number of frames row)
- 410 (sequence number row)
- 412 (subcommand code row)

FIG. 4A

SET_ACCESS_CONTROL - REPLY FORMAT

| OFFSET | LENGTH | DESCRIPTION |
|---|---|---|
| 0 | 2 | LENGTH OF THIS COMMAND INCLUDING THIS LENGTH OF FIELD — 452 |
| 2 | 2 | RESERVED — 454 |
| 4 | 4 | COMMAND CODE '00010000'X SET_ACCESS_CONTROL — 456 |
| 8 | 2 | RETURN CODE FOR THIS COMMAND<br>'0000'X - INDICATES SUCCESS<br>'0004'X - COMMAND NOT SUPPORTED<br>'0008'X - CONNECTION ALREADY IN NON-ISOLATED ACCESS STATE<br>'0010'X - CONNECTION ALREADY IN ISOLATED ACCESS STATE<br>'0014'X - ADAPTER IS NOT IN SHARED STATE (DEDICATED)<br>'0018'X - SEQUENCE ERROR - CHECKSUM OFFLOAD ACTIVE |
| 10 | 1 | TOTAL NUMBER OF FRAMES USED IN THIS REQUEST (1 FOR THIS COMMAND) — 458 |
| 11 | 1 | SEQUENCE NUMBER OF THIS FRAME (1 FOR THIS COMMAND) — 460 |
| 12 | 4 | RESERVED |
| 16 | 4 | SUBCOMMAND CODE — 462 |
| 20 | 8 | RESERVED |

DATA ISOLATION IN SHARED RESOURCE ENVIRONMENTS

CROSS-REFERENCE TO RELATED APPLICATIONS

This application is a continuation of U.S. application Ser. No. 12/246,718 entitled "DATA ISOLATION IN SHARED RESOURCE ENVIRONMENTS", filed Oct. 7, 2008, which published Apr. 8, 2010, as U.S. Patent Publication No. 2010/0088708 A1, and which is hereby incorporated herein by reference in its entirety.

TECHNICAL FIELD

This invention relates, in general, to shared resource environments, and in particular, to providing data isolation in such a shared environment.

BACKGROUND OF THE INVENTION

A shared resource environment enables workloads executing within the environment, even those of different customers, to be consolidated on one machine allowing the resources of that machine to be shared.

In one example, a shared resource environment includes a zSeries® central processing complex (CPC) offered by International Business Machines Corporation. The central processing complex is logically partitioned, and each partition is responsible for performing work. Communication between the partitions is, for instance, via a shared resource, such as a shared Open Systems Adapter (OSA), and/or via an external network.

The shared adapter enables communications between the partitions to be internal, thus, increasing processing speed. However, the use of the shared adapter affects the ability to provide secure communications for the different workloads executing within the different partitions.

SUMMARY OF THE INVENTION

Based on the foregoing, a need exists for a shared environment that still offers data isolation for various customers. In particular, a need exists for a capability that provides isolation of a data connection of a shared resource, while still allowing sharing between other data connections of that same shared resource.

The shortcomings of the prior art are overcome and additional advantages are provided through the provision of a method of facilitating data isolation in a shared resource environment. The method includes, for instance, having a sharable resource within the shared resource environment, the sharable resource including a plurality of data connections to enable communication within the shared resource environment absent use of an external network; identifying to the sharable resource a data connection of the plurality of data connections to be placed in isolation mode, for increased data security, from any communication within the sharable resource between data connections thereof, and to require that communication to and from the data connection pass through a component external to the sharable resource which controls communication between sharing entities which share the sharable resource; and isolating by the sharable resource the data connection of the plurality of data connections by placing the data connection in the isolation mode, wherein the isolating blocks communication within the sharable resource from the isolated data connection to all other data connections of the plurality of data connections, and blocks communication within the sharable resource to the isolated data connection from all other data connections of the plurality of data connections, but communication within the shareable resource between the other data connections of the plurality of data connections of the sharable resource is unaffected by the isolating.

System and computer program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4A depicts one example of a request format of a Set Access Control command used in accordance with an aspect of the present invention;

FIG. 4B depicts one embodiment of a reply format of the Set Access Control command used in accordance with an aspect of the present invention;

DETAILED DESCRIPTION

In accordance with an aspect of the present invention, a data isolation capability is provided that dynamically enables isolation of one or more data connections of a shared resource. With this capability, one or more data connections of the shared resource are isolated, while one or more other data connections of the shared resource are not isolated. The isolation of a data connection is dynamic in that it can be turned on or off based on a request or defined criteria while the connection is active. By isolating a data connection, communications between that data connection and other data connections of the shared resource (e.g., OSA port) are prevented. However, communication is available for that data connection via external components, such as firewalls and/or switches, which control the communication between sharing entities (such as logical partitions and virtual machines).

Figure 1:
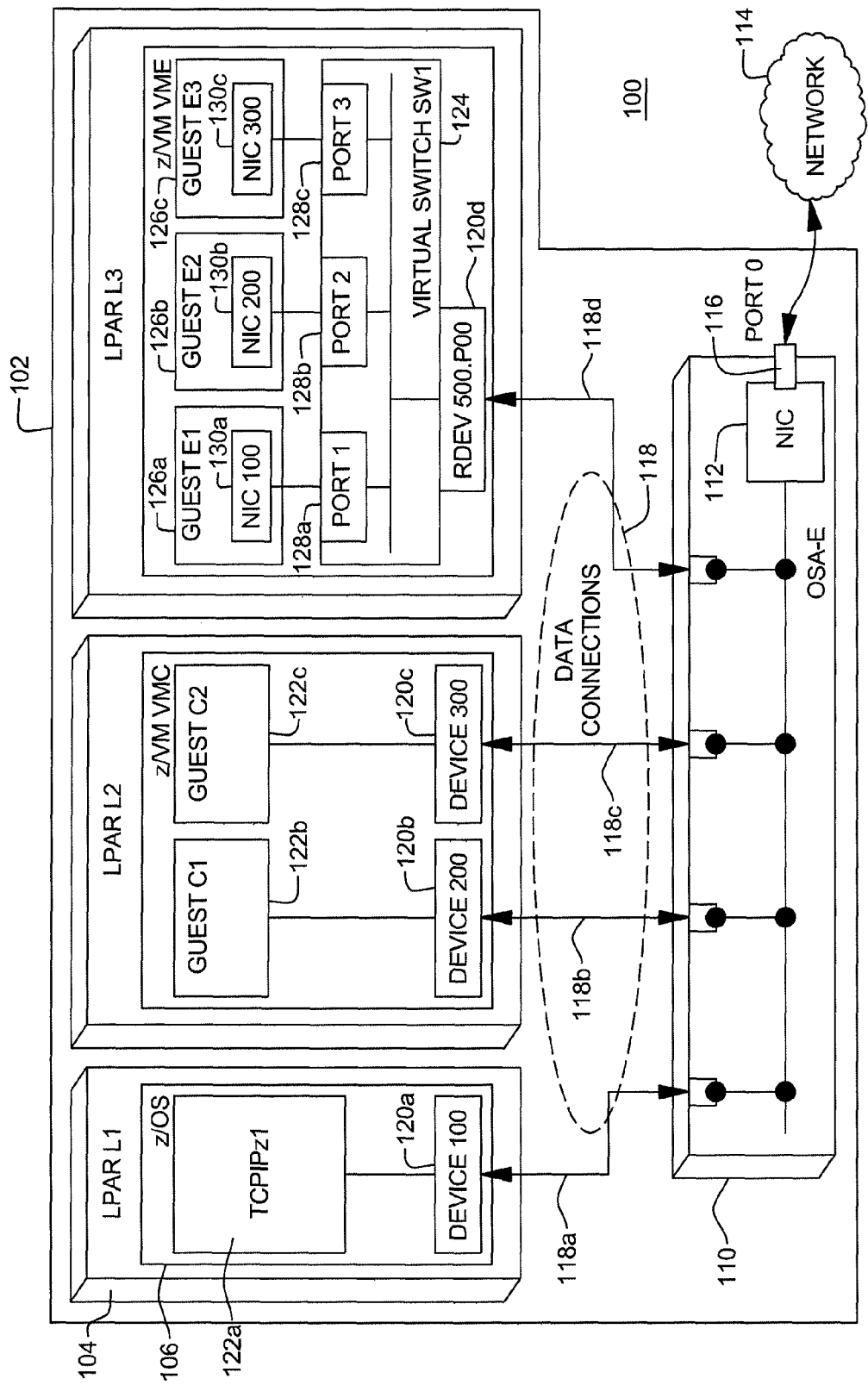
FIG. 1 depicts one embodiment of a shared resource environment to incorporate and use one or more aspects of the present invention.

One embodiment of a shared resource environment incorporating and using one or more aspects of the present invention is described with reference to FIG. 1. In one example, a shared resource environment 100 is based, for instance, on the z/Architecture® offered by International Business Machines Corporation, Armonk, N.Y., and includes, for instance, a zSeries® server, also offered by International Business Machines Corporation. The z/Architecture® is described in a publication entitled "z/Architecture—Principles of Operation," IBM® Publication No. SA22-7832-06, Seventh Edition, February 2008, which is hereby incorporated herein by reference in its entirety. z/Architecture®, zSeries® and IBM® are registered trademarks of International Business Machines Corporation, Armonk, N.Y., U.S.A. Other names used herein may be registered trademarks, trademarks or product names of International Business Machines Corporation or other companies.

In this example, shared resource environment 100 includes a central processor complex (CPC) 102, having, for instance, one or more partitions or zones 104 (e.g., logical partitions LPAR L1-LPAR L3). Each logical partition has a resident operating system 106, which may differ for one or more of the logical partitions. For example, logical partition 1 includes the z/OS® operating system, offered by International Business Machines Corporation; logical partition 2 is executing a z/VM® operating system, offered by International Business Machines Corporation; and logical partition 3 is operating an enhanced z/VM® operating system. Although in this example, three logical partitions are described, other embodiments can include more, less or the same number of logical partitions. Further, one or more of the partitions may not be executing an operating system, and/or operating systems other than those described herein may be executed. Many other variations are possible. z/OS® and z/VM® are registered trademarks of International Business Machines Corporation.

Each logical partition is coupled to a shared network connection, such as an OSA-Express adapter 110. Adapter 110 includes, for instance, a network interface card 112, which enables communication via an external network 114. External network 114 is coupled to the network interface card via a port 116. Network 114 may be used to communicate between the logical partitions of this shared resource environment or with processors of other processing environments.

Adapter 110 includes a plurality of data connections 118, each of which is coupled to a device within a logical partition. For instance, a data connection 118a is coupled to a device 120a in LPAR 1; data connections 118b, 118c are coupled to devices 120b, 120c, respectively, in LPAR 2; and a data connection 118d is coupled to a device 120d in LPAR 3. In one example, the data connections are queued direct I/O (QDIO) data connections.

Device 120a is further coupled to an entity 122a (such as TCP/IP) in LPAR 1; devices 120b, 120c are further coupled to entities 122b, 122c (such as Guest C1, Guest C2), respectively, in LPAR 2; and device 120d is further coupled to a virtual switch 124 in LPAR 3.

Virtual switch 124 enables further sharing of data among entities 126a, 126b and 126c (e.g., Guest E1, E2 and E3) of LPAR 3. The virtual switch includes a plurality of ports 128a, 128b and 128c, each of which is coupled to a respective guest via a network interface card 130a, 130b, and 130c, respectively. The virtual switch allows the guests coupled thereto to communicate with one another without using the adapter or the external network.

Although the use of adapter 110 is desirable to provide internal communications among the logical partitions coupled to the adapter, it is also desirable, at times, to isolate one or more of the data connections of the adapter from the other data connections to increase data security. Thus, in accordance with an aspect of the present invention, an isolation capability is provided in which one or more data connections of the shared adapter are selected to be isolated. This selection can occur during initialization or at any time. In response to selecting a data connection for isolation, the data connection is dynamically placed in isolation mode by changing an indicator associated with the connection. When the data connection is in isolation mode, it cannot communicate with other data connections of the shared resource. Instead, it communicates via the external network. This is depicted in FIG. 2.

Figure 2:
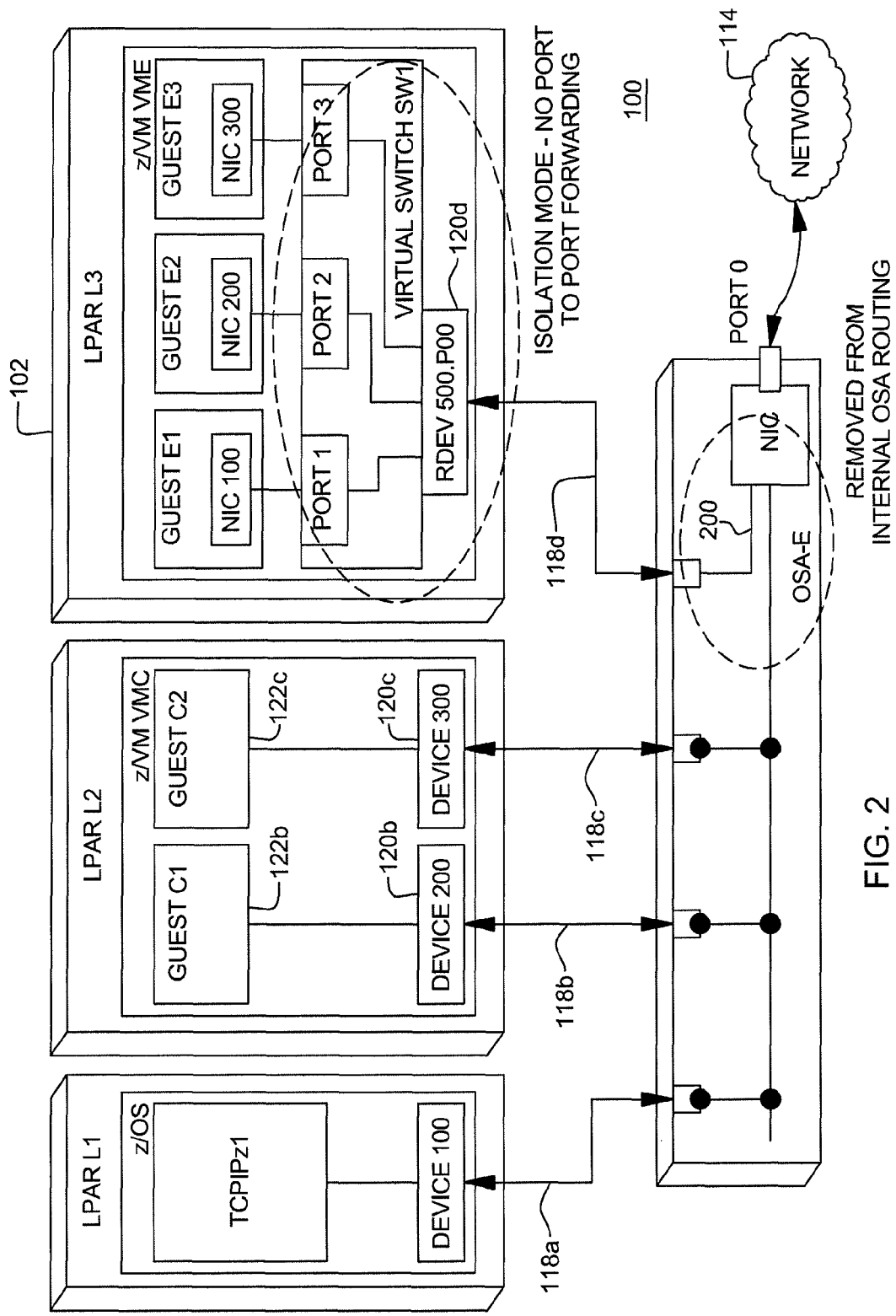
FIG. 2 depicts one example of the shared resource environment of FIG. 1 in which data isolation is provided, in accordance with an aspect of the present invention.

As shown in FIG. 2, data connection 118d is not connected (see reference number 200) to data connections 118a-118c. Thus, in order for LPAR 3 to communicate with LPAR 1 and LPAR 2, it needs to go through network 114. However, data connections 118a, 118b and 118c are not isolated, and thus, LPAR 1 and LPAR 2 can communicate with one another internally, i.e., without using external network 114. Any one or more of the data connections can be dynamically isolated, including a data connection of one LPAR, while a data connection of that same LPAR remains non-isolated. For example, data connection 118b can be isolated, while data connection 118c is non-isolated. In this situation, data connection 118b cannot communicate to the other data connections, but 118c can so communicate. Further details regarding this isolation capability are described below.

Figure 3:
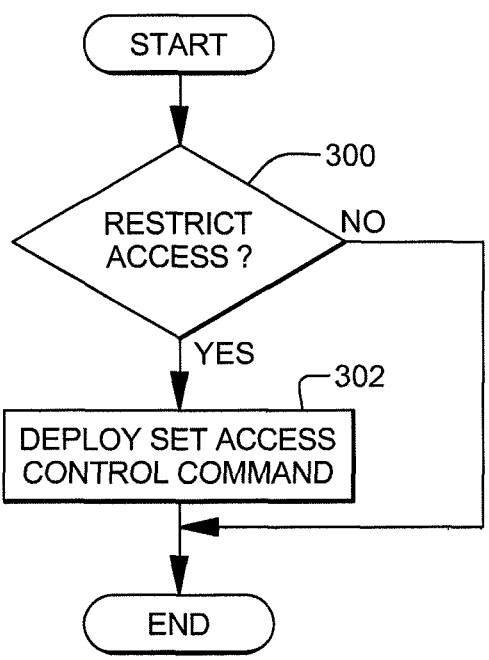
FIG. 3 depicts one embodiment of the logic associated with providing data isolation, in accordance with an aspect of the present invention.

One embodiment of the logic associated with providing isolation in a shared resource environment is described with reference to FIG. 3. A determination is made as to whether access is to be restricted, INQUIRY 300. As examples, the owner of the data connection (e.g., the LPAR, the guest, or another program, depending on configuration) makes this decision based on a received request to isolate the data connection, based on configuration to restrict access, or based on predefined criteria. If it is determined that access is to be restricted, then the connection owner deploys a Set Access Control command in order to isolate the particular data connection, STEP 302. In one example, the Set Access Control command is a subcommand of a SETADAPTERPARMS command. In other examples, however, the Set Access Control command is not a subcommand of another command.

The Set Access Control command sets the access control for the target data connection in which this command was received. By default, the access control is non-isolated, which is the default state of the connection. The following subcommand codes can be used to set the access control for the data connection:

'00000000'X Set Access Control State to Non-isolated—This subcommand returns the connection to its default access state. In the non-isolated state, routing of traffic commences between the target connection and all sharing active data connections on the same adapter (e.g., OSA CHPID).

'00000001'X Set Access Control State to Isolated Forward—This subcommand places the requestor's data connection into an isolated forward state. A connection in this state is unable to directly communicate with any sharing data connections (or hosts) on this adapter. All locally destined traffic to and from this isolated data connection is sent out on the wire (forward), i.e., the network. All inbound and outbound traffic flows between the data connection and the external LAN (wire).

'00000002'X Set Access Control State to Isolated Drop—This subcommand places the requestor's data connection into an isolated drop state. A connection in this state is unable to directly communicate with any sharing data connections (or hosts) on this adapter. All locally destined traffic to and from this isolated data connection will be dropped. All inbound and outbound traffic flows between the host and the external LAN (wire).

One example of a format of a Set Access Control request is described with reference to FIG. 4A. As shown, a request 400 includes, for instance:

Length field 402 specifying the length of this command including the length field;

Command code 404 specifying the Set Access Control command;

Return code 406 indicating the return code for this command;

Total number of frames used field 408 indicating the total number of frames used in this request, which is, for instance, one for this command;

Sequence number field 410 specifying the sequence number for this frame, which is, for instance, one;

Subcommand code 412 indicating the particular action being taken. These codes include, for instance, setting access control state to non-isolated; setting access control state to isolated forward; and setting access control state to isolated drop.

In response to executing the Set Access Control command, a reply is provided. One embodiment of a format of the reply is described with reference to FIG. 4B. In one example, a reply 450 includes, for instance, Length field 452 specifying the length of this command including the length field;

Command code 454 indicating the Set Access Control command;

Return code 456 indicating the return code for this command, including, for instance, success; command not supported; connection already in non-isolated access state; connection already in isolated access state; adapter is not in shared state; or sequence error; Total number of frames used in this request 458 indicating the total number of frames used (e.g., 1);

Sequence number for the frame 460; and

Subcommand code 462 indicating the subcommand code.

Figure 5:
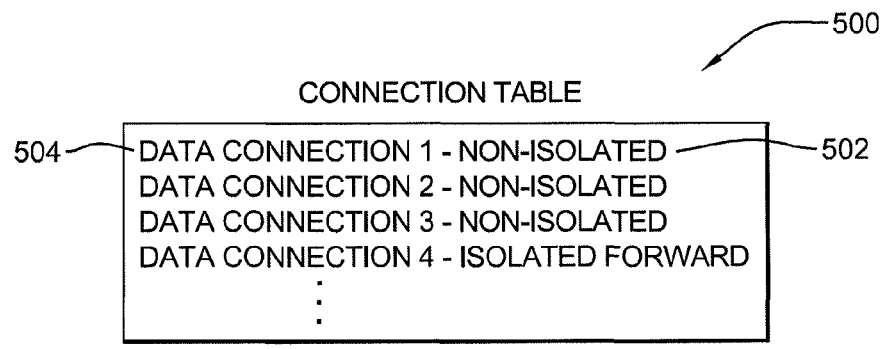
FIG. 5 depicts one example of a connection table used in accordance with an aspect of the present invention.
Figure 6:
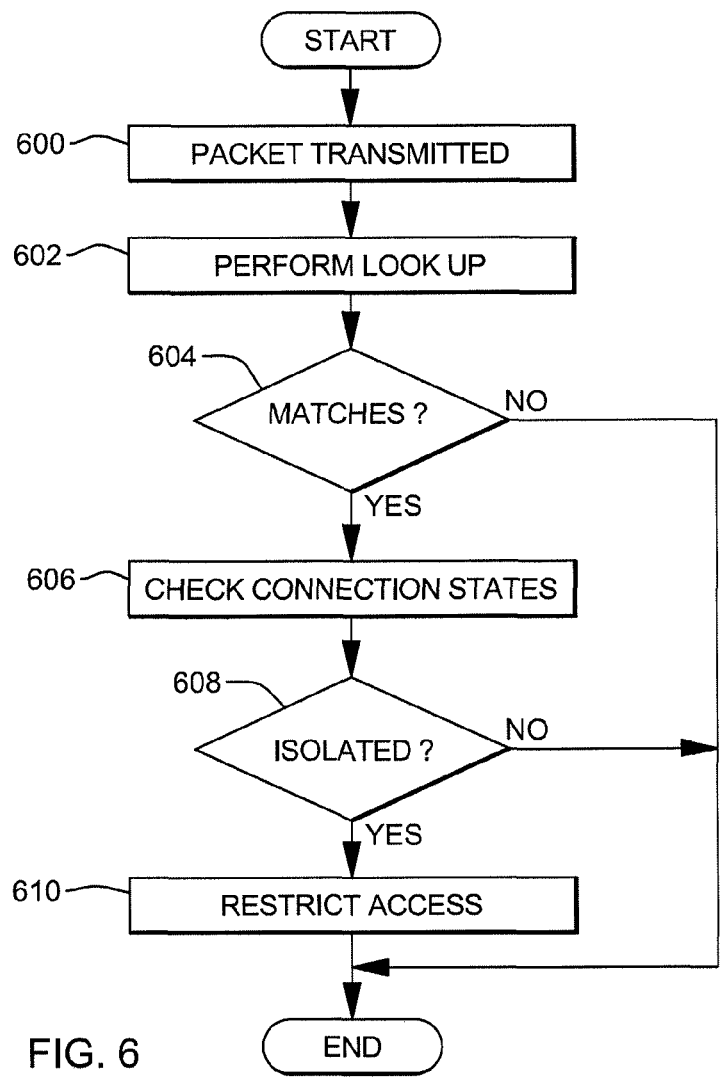
FIG. 6 depicts one embodiment of the logic used during packet transmission, in accordance with an aspect of the present invention.

A table is maintained in the adapter that describes the characteristics of each of its connections communicating with the hardware. As shown in FIG. 5, included within a data connection table 500 is a connection state 502 for each data connection 504 of the adapter. This table is updated as a result of executing the Set Access Control command and is used during transmission of a packet, as described with reference to FIG. 6.

Each time a packet is transmitted from a data connection, STEP 600, a lookup is performed in a table in order to determine whether the data connection from where the data packet is coming (i.e., the source data connection) and the destination data connection are part of the same adapter, STEP 602. In particular, a lookup is performed on the next hop IP address if this connection is a Layer 3 connection or the MAC address if this connection is a Layer 2 connection. If the lookup matches, INQUIRY 604, indicating the source and destination data connections are on the same adapter, then the connection state is checked on both the source and destination connections by checking the connection state table, STEP 606. If at least one of the connections is set to isolated, INQUIRY 608, no logical partition to logical partition traffic is permitted between the isolated connection and any other connection hooked to this adapter, STEP 610. The isolated connection cannot communicate with any other data connection of that adapter whether or not in the same logical partition or other logical partitions. If both data connections are not isolated, then communication between the data connections is permitted. Inbound traffic is treated normally.

Examples of specific behavior of the hardware based on frame type is described in the following table:

| Source LPAR Set Access Control Setting | Destination LPAR Set Access Control Setting | OSA Action |
|---|---|---|
| Unicast | | |
| Isolated/DROP | Isolated/DROP | DROP |
| Isolated/FORWARD | Isolated/DROP | DROP |
| Isolated/DROP | Isolated/FORWARD | DROP |
| Isolated/FORWARD | Isolated/FORWARD | FORWARD |
| Isolated/DROP | Non-Isolated | DROP |
| Isolated/FORWARD | Non-Isolated | FORWARD |
| Non-Isolated | Isolated/DROP | DROP |
| Non-Isolated | Isolated/FORWARD | FORWARD |
| Non-Isolated | Non-Isolated | LPAR to LPAR |
| Multicast/Broadcast | | |
| Isolated/DROP | Isolated/DROP | FORWARD to lan NO Lpar to Lpar |
| Isolated/FORWARD | Isolated/DROP | FORWARD to lan NO Lpar to Lpar |
| Isolated/DROP | Isolated/FORWARD | FORWARD to lan NO Lpar to Lpar |
| Isolated/FORWARD | Isolated/FORWARD | FORWARD to lan NO Lpar to Lpar |
| Isolated/DROP | Non-Isolated | FORWARD to lan NO Lpar to Lpar |
| Isolated/FORWARD | Non-Isolated | FORWARD to lan NO Lpar to Lpar |
| Non-Isolated | Isolate/DROP | FORWARD to lan Lpar to Lpar- except Isolated Connection |
| Non-Isolated | Isolated/FORWARD | FORWARD to lan Lpar to Lpar- except Isolated Connection |
| Non-Isolated | Non-Isolated | FORWARD to lan Lpar to Lpar |

In the above table, FORWARD means that the packet will be sent onto the network (e.g., LAN), and DROP means the packet will be terminated in the adapter and not sent onto the network.

In accordance with an aspect of the present invention, there is no limit on when or how often the command may be issued on an active connection to change the isolation mode. In one example, it may be issued during the OSA driver initialization sequence; however, in other examples, it is supported throughout the life of a connection to allow for changing network topologies and security policies. Thus, the capability is dynamic in that the isolation mode of selected connections can be turned on/off at will.

Figure 7:
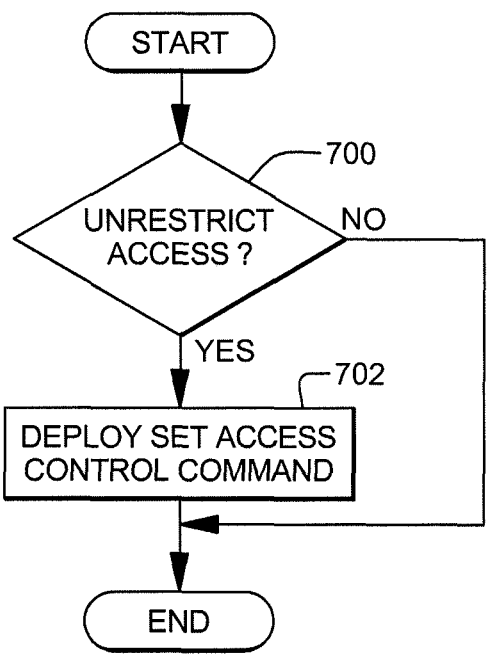
FIG. 7 depicts one embodiment of the logic associated with providing a non-isolated data connection, in accordance with an aspect of the present invention.

One embodiment of the logic associated with changing the connection back to non-isolated is described with reference to FIG. 7. If an owner of a data connection determines that access is to be unrestricted, INQUIRY 700, then the Set Access Control command is deployed in order to change the data connection state from isolated to non-isolated, STEP 702. This allows the data connection to communicate with the other data connections of the adapter.

In another aspect of the present invention, further isolation can be provided on the virtual switch, as shown in FIG. 2. In this aspect, the virtual switch is placed in isolation mode in which no port-to-port forwarding is allowed. As shown in FIG. 2, ports 1, 2 and 3 of the virtual switch in logical partition 3 are no longer coupled to one another, but instead, are all individually connected to device 120d. Thus, in order for the guests within logical partition 3 to communicate with one another or to communicate with any of the other logical partitions, communication is routed through the network. The virtual switch will configure/change its data connection access state as isolated drop when the switch itself has been configured to operate in an isolated state.

Described in detail above is an isolation capability that enables an owner of a data connection to dynamically determine whether the data connection is to be in isolation mode or non-isolation mode. It can further dynamically determine the type of isolation mode (e.g., DROP, FORWARD) for the data connection.

In a further aspect of the present invention, computing infrastructure is deployed, which includes integrating computer readable code into a computing system wherein the code, in combination with the computing system, is capable of performing data isolation. In one example, a service provider can create, maintain, support, etc. a computing infrastructure that performs data isolation for one or more customers. In return, the service provider can receive payment from the customer(s) under a subscription and/or fee arrangement and/or the service provider can receive payment from the sale of advertising content to one or more third parties. Any of the components of the present invention could be deployed, managed, or serviced by a service provider who offers data isolation, reliability analysis, and/or configuration, server and/or storage optimization.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
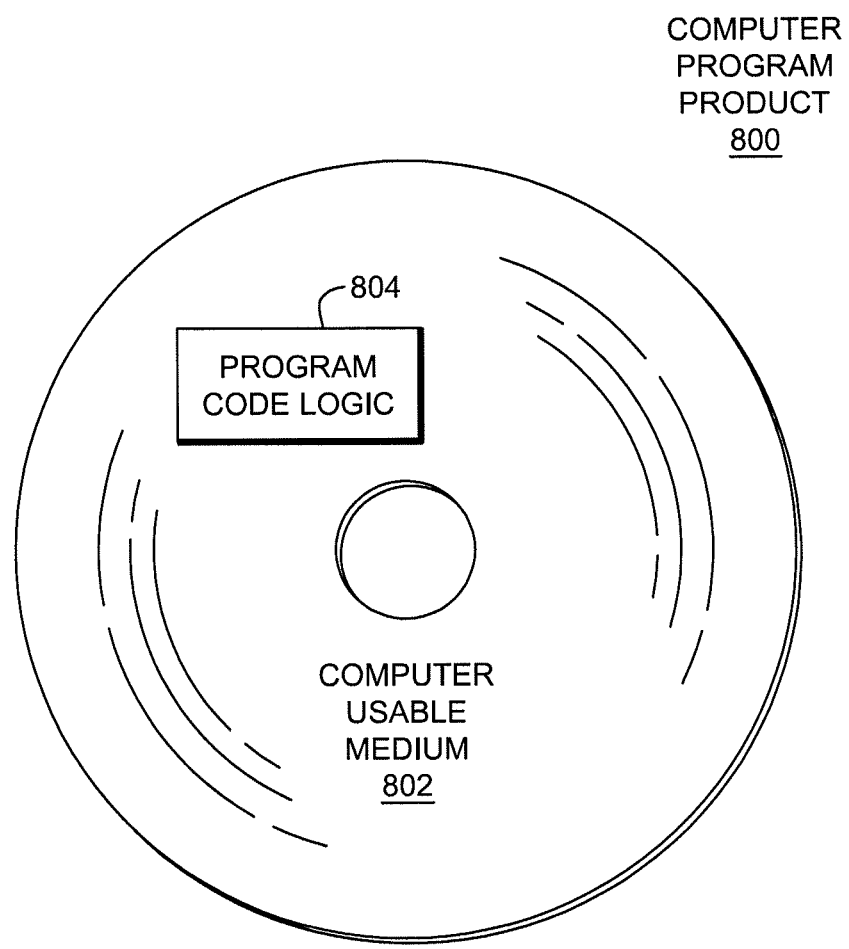
FIG. 8 depicts one embodiment of a computer program product incorporating one or more aspects of the present invention.

One example of an article of manufacture or a computer program product incorporating one or more aspects of the present invention is described with reference to FIG. 8. A computer program product 800 includes, for instance, one or more computer usable media 802 to store computer readable program code means or logic 804 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided that enables a data connection of a shared adapter to be dynamically placed in isolation mode or to be removed from isolation mode. In particular, a data connection owner can dynamically and programmatically change the access state of its data connection. The state of a data connection can be toggled between isolated and non-isolated mode. Isolation enhances data security for the data connection and those entities using the data connection.

With this invention, multi-tier security zones are supported. Multi-tier security zones are fast becoming the network configuration standard for workloads deployed in a virtualized environment, such as Linux on System Z®. In this environment, hosts are to be secured from cross-talk in non-VLAN configurations. System Z® is a registered trademark of International Business Machines Corporation.

With the z/VM® virtual switch support in place, clients do not want their security zones breached by OSA's internal routing (LPAR to LPAR). One could "dedicate" an entire OSA to the virtual switch, but based on the size of the configuration and growth plans, that would be cost prohibitive. With this design, support would be available for the virtual switch (or any operating system host) to isolate its data connection from other sharing connections (both inbound and outbound), while still allowing existing sharing data connections (hosts like z/OS® and etc.) to function as they do today (LPAR to LPAR), thus preserving the virtualization proposition of OSA.

Although various embodiments are described above, these are only examples. Other types of connections, adapters, and environments can benefit from one or more aspects of the present invention. Further, data structures, other than the tables described herein, can include the information to be maintained. Yet further, the tables or other data structures can include, more, less or different information than described herein. Still further, the request and/or reply blocks of the command can include more, less or different information; the information can be in a different order; and/or the size of the fields can be different.

Yet further, one or more aspects of the present invention can be incorporated and used in environments without virtual networks or the virtual network can be configured differently than described herein. Still further, one or more aspects of the present invention are applicable to shared resources other than adapters. Many other variations are possible.

Moreover, an environment may include an emulator (e.g., software or other emulation mechanisms), in which a particular architecture (including, for instance, instruction execution; architected functions, such as address translation; and architected facilities, such as architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating data isolation in a shared resource environment, said method comprising:
   having a sharable resource within the shared resource environment, said sharable resource comprising a plurality of data connections to enable communication of resources within the shared resource environment through the sharable resource absent use of an external network;
   identifying to the sharable resource a data connection of the plurality of data connections to be placed in isolation mode, for increased data security, from any communication within the sharable resource between data connections thereof, and to require that communication to and from the data connection pass through a component external to the sharable resource which controls communication between sharing entities which share the sharable resource, in order to communicate with resources of the shared resource environment utilizing data connections to the sharable resource that are not in isolation mode;
   responsive to the identifying, isolating by a virtual switch of the sharable resource the data connection of the plurality of data connections by placing the data connection in the isolation mode, wherein the isolating blocks communication within the sharable resource from the isolated data connection to all other data connections of the plurality of data connections, and blocks communication within the sharable resource to the isolated data connection from all other data connections of the plurality of data connections, but communication within the sharable resource between the other data connections of the plurality of data connections of the sharable resource is unaffected by the isolating; and
   returning, by the virtual switch of the sharable resource, the isolated data connection to a non-isolation mode, wherein the returning resumes communication within the sharable resource from the non-isolated data connection to all other data connections of the plurality of data connections, and resumes communication within the sharable resource to the non-isolated data connection from all other data connections of the plurality of data connections, wherein there are a plurality of types of isolation, including isolated forward and isolated drop, wherein the isolated forward type of isolation comprises forwarding to the component external to the sharable resource all communication from the isolated data connection destined for any other data connection of the plurality of data connections, and all communication destined for the isolated data connection from any other data connection of the plurality of data connections.

2. The method of claim 1, wherein the sharable resource comprises an adapter.

3. The method of claim 1, wherein the isolating is dynamic in that the isolating is performed one or more times when the data connection is active.

4. The method of claim 1, wherein the isolating comprises setting an access control indicator to indicate isolated.

5. The method of claim 4, wherein the setting comprises employing a set access control command to set the access control indicator to indicate isolated.

6. The method of claim 4, wherein the access control indicator is maintained in a data structure, said data structure referred to in transmitting a packet via the data connection.

7. The method of claim 1, wherein the isolating comprises setting an access control indicator to indicate isolated forward or isolated drop.

8. The method of claim 1, wherein the unrestricting comprises setting an access control indicator to indicate non-isolated.

9. The method of claim 8, wherein the setting comprises employing a set access control command to set the access control indicator to indicate non-isolated.

10. A system of facilitating data isolation in a shared resource environment, said system comprising:
    a sharable resource within the shared resource environment, said sharable resource comprising a plurality of data connections to enable communication of resources within the shared resource environment through the sharable resource absent use of an external network;
    a processor in communications with the sharable resource, wherein the system is capable of performing a method, said method comprising identifying to the sharable resource a data connection of the plurality of data connections to be placed in isolation mode, for increased data security, from any communication with the sharable resource between data connection thereof, and to request that communication to and from the data connection pass through a component external to the sharable resource which controls communication between sharing entities which share the sharable resource, in order to communicate with resources of the shared resource environment utilizing data connections to the sharable resource that are not in isolation mode;
    responsive to the identifying, dynamically isolating by a virtual switch of the sharable resource the data connection of the plurality of data connections by placing the data connection in the isolation mode, wherein communication within the sharable resource from the isolated data connection to all other data connections of the plurality of data connections is blocked, and wherein communication within the sharable resource to the isolated data connection from all other data connections of the plurality of data connections is blocked, but communication within the sharable resource between the other data connections of the plurality of data connections of the sharable resource is unaffected by placing the data connection is isolation mode; and returning, by the virtual switch of the sharable resource, the isolated data connection to a non-isolation mode, wherein the returning resumes communication within the sharable resource from the non-isolated data connection to all other data connections of the plurality of data connections, and resumes communication within the sharable resource to the non-isolated data connection from all other data connections of the plurality of data connections, wherein there are a plurality of types of isolation, including isolated forward and isolated drop, wherein the isolated forward type of isolation comprises forwarding to the component external to the sharable resource all communication from the isolated data connection destined for any other data connection of the plurality of data connections, and all communication destined for the isolated data connection from any other data connection of the plurality of data connections.

11. The system of claim 10, wherein the isolating is dynamic in that the isolating is performed one or more times when the data connection is active.

12. The system of claim 10, wherein the isolating comprises setting an access control indicator to indicate isolated.

13. The system of claim 10, wherein the isolating comprises setting an access control indicator to indicate isolated forward or isolated drop.

14. A computer program product to facilitate data isolation in a shared resource environment, said computer program product comprising:

a non-transitory storage medium readable by a processing circuit and storing instructions for execution by the processing circuit for performing a method comprising:

having a sharable resource within the shared resource environment, said sharable resource comprising a plurality of data connections to enable communication of resources within the shared resource environment through the sharable resource absent use of an external network;

identifying to the sharable resource a data connection of the plurality of data connections to be placed in isolation mode, for increased data security, from any communication within the sharable resource between data connections thereof, and to require that communication to and from the data connection pass through a component external to the sharable resource which controls communication between sharing entities which share the sharable resource, in order to communicate with resources of the shared resource environment utilizing data connections to the sharable resource that are not in isolation mode;

responsive to the identifying, dynamically isolating by a virtual switch of the sharable resource the data connection of the plurality of data connections by placing the data connection in the isolation mode, wherein the isolating blocks communication within the sharable resource from the isolated data connection to all other data connections of the plurality of data connections, and blocks communication within the sharable resource to the isolated data connection from all other data connections of the plurality of data connections, but communication within the sharable resource between the other data connections of the plurality of data connections of the sharable resource is unaffected by the isolating; and returning, by the virtual switch of the sharable resource, the isolated data connection to a non-isolation mode, wherein the returning resumes communication within the sharable resource from the non-isolated data connection to all other data connections of the plurality of data connections, and resumes communication within the sharable resource to the non-isolated data connection from all other data connections of the plurality of data connections, wherein there are a plurality of types of isolation, including isolated forward and isolated drop, wherein the isolated forward type of isolation comprises forwarding to the component external to the sharable resource all communication from the isolated data connection destined for any other data connection of the plurality of data connections, and all communication destined for the isolated data connection from any other data connection of the plurality of data connections.

15. The computer program product of claim 14, wherein the isolating is dynamic in that the isolating is performed one or more times when the data connection is active.

16. The computer program product of claim 14, wherein the isolating comprises setting an access control indicator to indicate isolated.

17. The computer program product of claim 14, wherein the isolating comprises setting an access control indicator to indicate isolated forward or isolated drop.

* * * * *